(12) United States Patent
Niu

(10) Patent No.: US 8,728,282 B2
(45) Date of Patent: May 20, 2014

(54) INDUSTRIAL CONTINUOUS CRACKING DEVICE OF PLASTICS

(76) Inventor: Bin Niu, Shandong (CN)

(*) Notice: Subject to any disclaimer, the term of this patent is extended or adjusted under 35 U.S.C. 154(b) by 945 days.

(21) Appl. No.: 12/735,290

(22) PCT Filed: Dec. 28, 2007

(86) PCT No.: PCT/CN2007/003858
§ 371 (c)(1),
(2), (4) Date: Jun. 28, 2010

(87) PCT Pub. No.: WO2009/082842
PCT Pub. Date: Jul. 9, 2009

(65) Prior Publication Data
US 2010/0282590 A1    Nov. 11, 2010

(30) Foreign Application Priority Data
Dec. 27, 2007   (CN) .......................... 2007 1 0116223

(51) Int. Cl.
*C10B 1/10* (2006.01)
*C10B 49/16* (2006.01)
*C10B 53/07* (2006.01)

(52) U.S. Cl.
USPC ........... 202/100; 202/108; 202/117; 202/136; 202/249

(58) Field of Classification Search
USPC ............ 201/12; 202/100, 108, 117, 118, 131, 202/136, 208, 216, 249; 422/209; 432/27, 432/215; 585/241
See application file for complete search history.

(56) References Cited

U.S. PATENT DOCUMENTS

| | | | | |
|---|---|---|---|---|
| 1,751,127 A | * | 3/1930 | Cantieny | 202/136 |
| 1,842,906 A | * | 1/1932 | Lampe | 202/131 |
| 3,401,923 A | * | 9/1968 | Bearce | 432/215 |

* cited by examiner

*Primary Examiner* — Jill Warden
*Assistant Examiner* — Joye L Woodard
(74) *Attorney, Agent, or Firm* — Raymond Y. Chan; David and Raymond Patent Firm

(57) ABSTRACT

This invention is about an industrial continuous cracking device of plastics. The technical program of this invention is as following: it includes the outer cylinder and the internal cylinder, and the two sides of the internal cylinder are connected with the outer cylinder; at least one of the outer cylinder and the internal cylinder is set with heating mechanism, and the helical ribbon is fixed in the inside of the outer cylinder wall; the transport mechanism is fixed in the internal cylinder, with its direction contrary to the outer cylinder's the feeding direction. The structures of this invention are simple, and it can reduce the possessive space. Furthermore, when cycling in the cylinder, the solid heat carrier has no heat energy loss, and that can substantially reduce the operation cost of the equipment.

16 Claims, 3 Drawing Sheets

INDUSTRIAL CONTINUOUS CRACKING DEVICE OF PLASTICS

BACKGROUND OF THE PRESENT INVENTION

1. Field of Invention

This invention is about a continuous cracking device of plastics.

2. Description of Related Arts

Previously, the applicant has developed the continuously cracking technology of plastics and its corresponding equipment, which first adopts the solid state heat carrier to heat the plastics. By using this method, it not only successfully resolves the coking problem in the cracking process, but also realizes the industrial production for the continuous cracking process of plastics. However, in that technology, because the device of the solid state heat carrier's return, the reheating process and the separating mechanism of the cracking solids were set outside of the cracking cavity, which makes the equipment structure more complex.

SUMMARY OF THE PRESENT INVENTION

The purpose of this invention is: designing a continuous cracking device of plastics, which has a simple configuration, small volume and low running cost.

The technical program of this invention is as following: it consists of the outer cylinder and the internal cylinder, and the two ends of the internal cylinder are connected with the outer cylinder; at least one of the outer cylinder and the internal cylinder is set with heating mechanism, and the helical ribbon is fixed in the inside of the outer cylinder wall; Inside the internal cylinder is fixed the transportation mechanism whose feeding direction is contrary to that of the outer cylinder; the import mechanism of solid state heat carrier, which is between the outer cylinder and the internal cylinder, is fixed on the inlet side of the internal cylinder; the mechanism, for separating the solid state heat carrier and the solid product produced in cracking, is set in the outer cylinder; the outlet of the oil-gas and solid product are set on the outer cylinder.

In this invention, one of the outer cylinder and the internal cylinder can be designed as the cracking cavity, and the other can be used as the cavity for depositing the returning solid state heat carrier. However, considering the volume of the materials to be transported, the outer cylinder is generally used for cracking, and the internal cylinder is used for the return of the solid state heat carrier. At the same time, because the two cavities are connected, so the solid state heat carrier can be heated when returning, and that can satisfy the temperature demand for the cracking process. In this way, the solid state heat carrier will form a cycle in the cylinder. And that not only simplifies the structure and reduces the space, but also the solid state heat carrier cycling in the cylinder has no heat loss and the operating cost is greatly reduced.

In this invention, the transport of the solid state heat carrier in the internal cylinder can be realized through a variety of ways. The detailed description of these ways is as following: designing the internal cylinder as acclivitous rotating cylinder, or setting the screw in the horizontal internal cylinder; designing the internal cylinder as acclivitous rotating cylinder, and the helical ribbon is fixed in the internal wall of it, which can transport the solid state heat carrier from one side to the other side with the rotation of the internal cylinder.

There are a variety of methods to transport the solid state heat carrier or the mixture of the solid state heat carrier and the raw materials from the outer cylinder to the internal cylinder. When the internal cylinder is acclivitous, the lower side can be used as the inlet of it; when the inlet of the internal cylinder is higher, the lifting mechanism can be specially set. The function of the lifting mechanism can be realized by the internal cylinder and the helical ribbon fixed in the wall of it. The detailed description of that is as following: a funnel is formed between the internal cylinder and the helical ribbon of it. That is, the bottom of the internal cylinder together with the helical ribbon forms a helicoid, and the funnel will be formed between the helicoid's end, the internal cylinder and the helical ribbon.

In order to complement the solid state heat carrier's lost heat in the cracking process and makes it satisfy the request of the again cracking reaction, it can be realized by setting higher temperature in the cylinder. However, for ensuring that the solid state heat carrier can absorb enough heat energy and the heating cost is lower, the heating mechanism should be respectively set in the outer cylinder and the internal cylinder. On the one hand, the internal cylinder's heating mechanism can be set in it's wall, on the other hand, the heating mechanism can also be fixed in the middle of the internal cylinder following its axial direction of. Then, the heating mechanism of the internal cylinder can use the same tube, and it can be as an entity with the internal cylinder. What's more, the two ends of the heating mechanism's prolongations out of the body of the outer cylinder are connected with the drive mechanism.

After the cracking process, in order to realize the separation of the solid product and the solid state heat carrier, it usually uses the method of setting the screen mesh in the cylinder. When the internal cylinder is used as the passage for transporting the solid state heat carrier, the solid state heat carrier's import mechanism, which is fixed on the import end of the internal cylinder, should be fixed on the top of the screen mesh. Furthermore, in order to conveniently transport the separated solid product, the screen mesh in this invention is designed into tube-shape, and the outside of it has the baffle, which can prevent the solid state heat carrier from flowing to the outside of the screen mesh. There the helical ribbon between the screen mesh's outside wall and the outer cylinder, and the helical ribbon can transport the solid product to the outlet. Furthermore, the inlet side of the internal cylinder should be set in the screen mesh at this time.

Combined with the reacting process and the structure of the internal cylinder in this invention, the outlet of the oil-gas, formed in the cracking process, is designed near the raw material's inlet.

The concrete structures of this invention are as following: they include the rotational outer cylinder and the internal cylinder; the two ends of the outer cylinder are movably connected with the outer crust through moving seal, a heating chamber is formed between them, and the heat carrier can pass through this heating chamber; the two sides of the outer cylinder can be connected with the shell cover through movable seal; the thermal pipe in the internal cylinder is connected with the internal cylinder through the helical ribbon; the thermal pipe passes through the shell cover and is connected with the shell cover through movable seal.

In this invention, the front port of the internal cylinder is corresponding to the outer cylinder's material-inlet, in order to make the raw materials gain enough heat energy in time and set off the reaction.

Based on the transmission's need, minor diameter joints can be set between the two ends of the outer cylinder, and the internal cylinder's inner wall, which is corresponding to the joints neighboring with the raw materials' inlet, is fixed with the helical ribbon; the inner wall of the internal cylinder, connecting with the other joint, is set with the helical ribbon, and that can realize the successful transportation of raw materials and the product produced in cracking.

These and other objectives, features, and advantages of the present invention will become apparent from the following detailed description, the accompanying drawings, and the appended claims.

Figure 1:
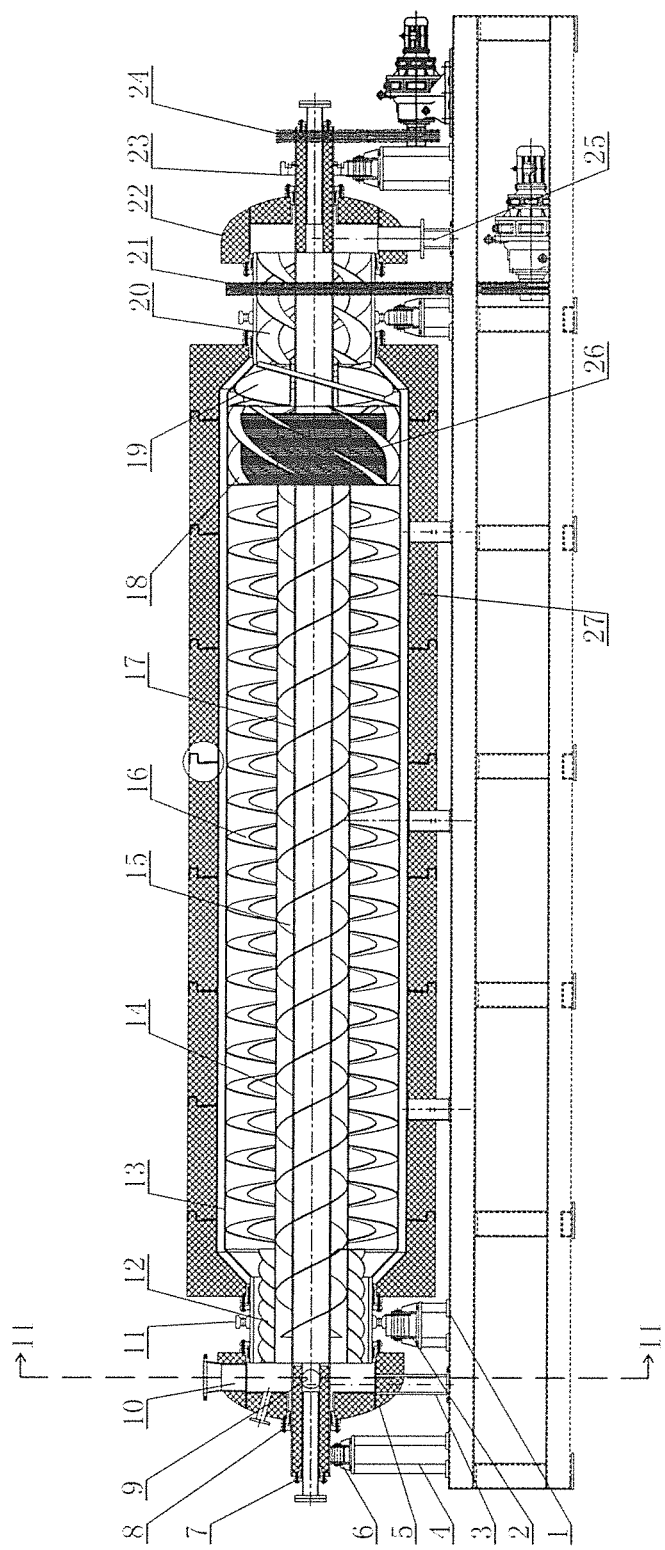
FIG. 1 is the part on-state cutaway view of the example 9 of this invention.
Figure 2:
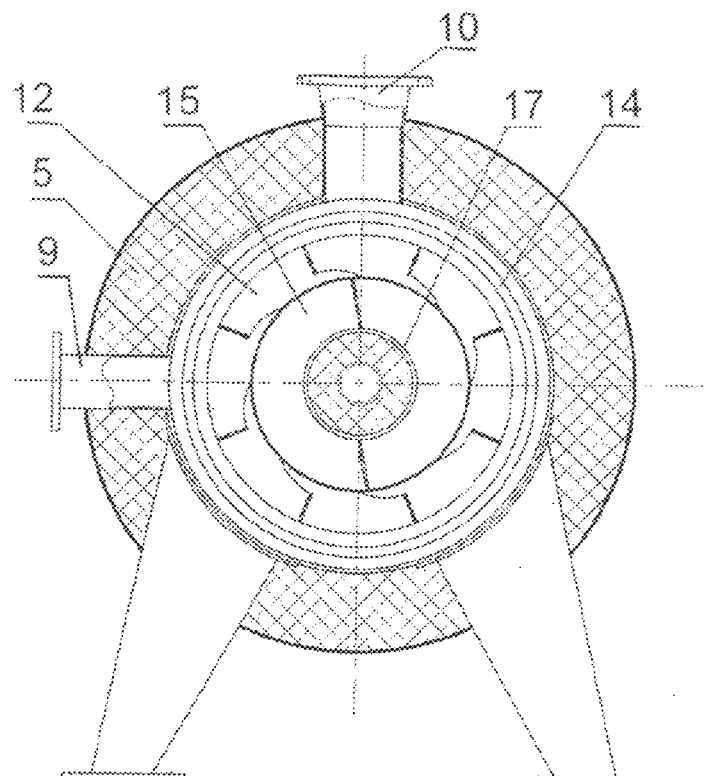
FIG. 2 is the sectional view of the invention corresponding to the broken line II-II of FIG. 1.
Figure 3:
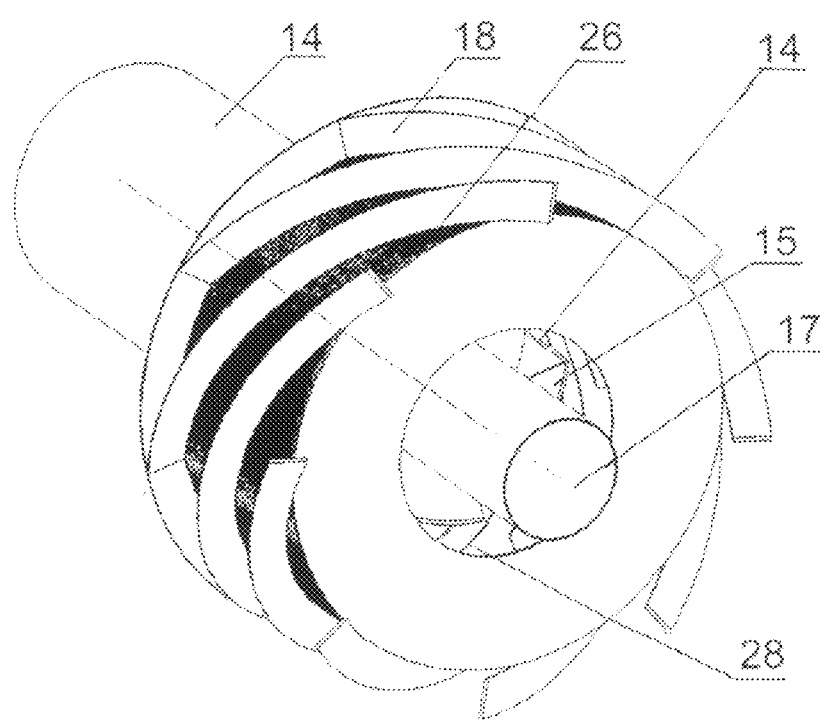
FIG. 3 is the stereogram viewing in the right of the screen mesh and the internal cylinder of this invention.
Figure 4:
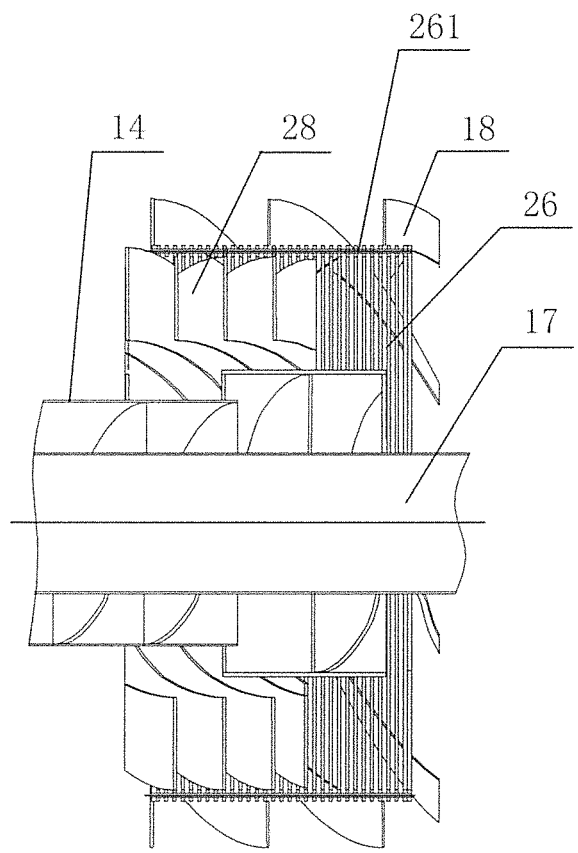
FIG. 4 is the on-state cutaway view of the screen mesh of this invention.
Figure 5:
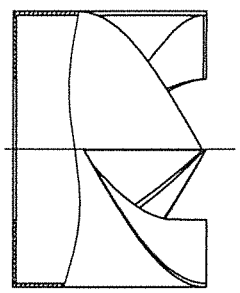
FIG. 5 is the main view of the internal cylinder's right part of this invention.

In these figures: 1. Supporting roller's support saddle, 2. Supporting roller's bracket, 3. Shell cover's leg, 4. Supporting roller's support saddle, 5. Left shell cover, 6. Supporting roller's bracket, 7 and 8. Moving seal, 9. Feeding inlet, 10. Oil-gas outlet, 11. Idler wheel, 12. Helical ribbon, 13. Outer cylinder, 14. Internal cylinder, 15 and 16. Helical ribbon, 17. The heat carrier's duct, 18. Helical ribbon, 19. Shoveling plate, 20. Helical ribbon, 21. Chain, 22. Right shell cover, 23. Idler wheel, 24. Sprocket wheel, 25. The ash's outlet, 26. Screen mesh, 27. Heat preservation layer, 28. Helical ribbon

DETAILED DESCRIPTION OF THE PREFERRED EMBODIMENT

Example 1

This example includes the outer cylinder and the internal cylinder, and the two ends of the internal cylinder are communicated with the outer cylinder. The heat mechanism is fixed in the outer cylinder, and the inner wall of the outer cylinder is set with helical ribbon. Inside the internal cylinder is fixed the transportation mechanism whose feeding direction is contrary to that of the outer cylinder. Furthermore, this transportation mechanism adopts the screw form. The liftingsing mechanism is set at the inlet of the internal cylinder, and it can transport the solid state heat carrier from the outer cylinder into the internal cylinder. The screening mechanism used for separating the solid state heat carrier and the solid product produced in cracking, is set in the outer cylinder. What's more, the oil-gas's outlet and the solid product's outlet corresponding with the screening mechanism are set on the outer cylinder.

Example 2

This example includes the outer cylinder and the internal cylinder, and the two ends of the internal cylinder are communicated with the outer cylinder. The heat mechanism is fixed in the outer cylinder, and the inner wall of the outer cylinder is set with helical ribbon. The heat mechanism is fixed on the internal cylinder's outer wall. Inside the internal cylinder is fixed the transportation mechanism whose feeding direction is contrary to that of the outer cylinder. Furthermore, this transportation mechanism adopts the screw form. The lifting mechanism is set at the inlet of the internal cylinder, and it can transport the solid state heat carrier from the outer cylinder into the internal cylinder. The screening mechanism used for separating the solid state heat carrier and the solid product produced in cracking, is set in the outer cylinder. What's more, the oil-gas's outlet and the solid product's outlet corresponding with the screening mechanism are set on the outer cylinder.

Example 3

This example includes the outer cylinder and the internal cylinder, and the two ends of the internal cylinder are communicated with the outer cylinder. The heat mechanism is fixed in the outer cylinder, and the inner wall of the outer cylinder is set with helical ribbon. Inside the internal cylinder is fixed the transportation mechanism whose feeding direction is contrary to that of the outer cylinder. Furthermore, this transportation mechanism is the helical ribbon, which is fixed on the internal cylinder inner wall. The lifting mechanism is set at the inlet of the internal cylinder, and it can transport the solid state heat carrier from the outer cylinder into the internal cylinder. The screening mechanism used for separating the solid state heat carrier and the solid product produced in cracking, is set in the outer cylinder. What's more, the oil-gas's outlet and the solid product's outlet corresponding with the screening mechanism are set on the outer cylinder.

Example 4

This example includes the outer cylinder and the internal cylinder, and the two ends of the internal cylinder are communicated with the outer cylinder. The heat mechanism is fixed in the outer cylinder, and the inner wall of the outer cylinder is set with helical ribbon. Inside the internal cylinder is fixed the transportation mechanism whose feeding direction is contrary to that of the outer cylinder. Furthermore, this transportation mechanism is the helical ribbon, which is fixed on the internal cylinder inner wall. The import mechanism is set at the inlet of the internal cylinder, and it can transport the solid state heat carrier from the outer cylinder into the internal cylinder. And this import mechanism is the funnel forming between the internal cylinder and the internal cylinder's helical ribbon. The screening mechanism used for separating the solid state heat carrier and the solid product produced in cracking, is set in the outer cylinder. What's more, the oil-gas's outlet and the solid product's outlet corresponding with the screening mechanism are set on the outer cylinder.

Example 5

This example includes the outer cylinder and the internal cylinder, and the two ends of the internal cylinder are communicated with the outer cylinder. The heat mechanism is fixed in the outer cylinder, and the inner wall of the outer cylinder is set with helical ribbon. Inside the internal cylinder is fixed the transportation mechanism whose feeding direction is contrary to that of the outer cylinder. Furthermore, this transportation mechanism is the helical ribbon fixed on the internal cylinder inner wall. The heating mechanism is fixed in the internal cylinder following the middle axial direction of it. The import mechanism is set at the inlet of the internal cylinder, and it can transport the solid state heat carrier from the outer cylinder into the internal cylinder. And this import mechanism is the funnel formed between the internal cylinder and the internal cylinder's helical ribbon. The screening mechanism used for separating the solid state heat carrier and the solid product produced in cracking, is set in the outer cylinder. What's more, the oil-gas's outlet and the solid product's outlet corresponding with the screening mechanism are set on the outer cylinder. The outlet of the oil-gas is designed near the raw material's inlet.

Example 6

This example includes the outer cylinder and the internal cylinder, and the two ends of the internal cylinder are communicated with the outer cylinder. At least one of the outer cylinder and the internal cylinder is set with heating mechanism, and the inner wall of the outer cylinder is set with helical ribbon. Inside the internal cylinder is fixed the transportation mechanism whose feeding direction is contrary to that of the outer cylinder. The solid state heat carrier's import mechanism is set at the inlet of the internal cylinder. The screening mechanism used for separating the solid state heat carrier and the solid product produced in cracking, is set in the outer cylinder. The oil-gas's outlet and the solid product's outlet are set on the outer cylinder. The screening mechanism of this example is the screen mesh fixed under the internal cylinder's inlet. The rest structures of this example adopt any one of the above examples.

Example 7

This example includes the outer cylinder and the internal cylinder, and the two ends of the internal cylinder are communicated with the outer cylinder. At least one of the outer cylinder and the internal cylinder is set with heating mechanism, and the inner wall of the outer cylinder is set with helical ribbon. Inside the internal cylinder is fixed the transportation mechanism whose feeding direction is contrary to that of the outer cylinder. The solid state heat carrier's import mechanism is set at the inlet of the internal cylinder. The screening mechanism used for separating the solid state heat carrier and the solid product produced in cracking, is set in the outer cylinder. The oil-gas's outlet and the solid product's outlet are set on the outer cylinder. The screening mechanism of this example is the annular screen mesh fixed on the internal cylinder's inlet, and the outer side of screen mesh has the baffle. The screen mesh is connected with the outer cylinder through the helical ribbon. The rest structures of this example adopt any one of the above examples.

Example 8

This example includes the outer cylinder and the internal cylinder. The diameter of the outer cylinder's main part is bigger, and this part has the helical ribbon fixed on the inner wall. Furthermore, the right end of the outer cylinder is fixed with annular screen mesh through the helical ribbon, the right end of which has the baffle. The main part of the outer cylinder is fixed in the crust, and the two ends of the crust are connected with the outer cylinder by moving seal. The inlet and outlet of the heat carrier are fixed on the crust. The two ends of the outer cylinder's main part have prolongation of minor diameter. And the prolongation is wrapt with the sprocket wheel, which is used for connecting with the power mechanism by the chain. The prolongation is connected with the left and right shell covers through movable seal respectively. The feeding inlet and oil-gas's outlet are fixed on the left shell cover, and the ash outlet of the solid product is fixed on the right shell cover. The heat carrier's duct is fixed in the outer cylinder following the axes direction of it. Furthermore, the two ends of the duct pass through the two shell covers and are connected with the shell covers by movable seal. The internal cylinder is fixed on the periphery of the heat carrier's duct via the helical ribbon. The left end of the internal cylinder is corresponding with the feeding inlet's position and inserts into the annular screen mesh. The right end of the internal cylinder is helicoid, and a funnel will be formed between the end of the helicoid, the internal cylinder and the helical ribbon. This funnel is used for transporting the solid heat carrier into the internal cylinder.

Example 9

As is shown in the figure, this example includes the outer cylinder 13 and the internal cylinder 14. The diameter of the outer cylinder 13's main part is bigger, and this part has the helical ribbon 16 movably fixed on the inner wall. Furthermore, the right end of the outer cylinder is fixed with annular screen mesh 26 through the helical ribbon 18, and the right end of the annular screen mesh 26 has the baffle 261. The main part of the outer cylinder 13 is fixed in the crust, and the two ends of the crust are connected with the outer cylinder 13 through movable seal. The inlet and outlet of the heat carrier are fixed on the crust. The two ends of the outer cylinder 13's main part have prolongation of minor diameter. And the prolongation is wrapt with the sprocket wheel, which is used for connecting with the power mechanism by the chain 21. The prolongation is connected with the left and right shell cover respectively. The feeding inlet 9 and oil-gas's outlet 10 are fixed on the left shell cover 5, and the ash outlet 25 of the solid product is fixed on the right shell cover 22. The heat carrier's duct 17 is fixed in the internal cylinder 14 following the axes direction of it. Furthermore, the two ends of the duct pass through the two shell covers 5, 22 and are connected with the shell covers through movable seal. The internal cylinder 14 is fixed on the periphery of the heat carrier's duct 17 via the helical ribbon 15. The left end of the internal cylinder 14 is corresponding to the feeding inlet 9's position and inserts into the annular screen mesh 26. The right end of the internal cylinder 14 is helicoid, and a funnel will be formed between the end of the helicoid, the internal cylinder 14 and the helical ribbon 15. This funnel is used for transporting the solid heat carrier into the internal cylinder 14.

On the left prolongation of the outer cylinder 13, the helical ribbon 12 is fixed on the internal cylinder 14's outer wall, and this helical ribbon 12 is used for transporting the raw material into the outer cylinder 13's main part. However, on the right prolongation of the outer cylinder 13, the helical ribbon 20 is fixed in the outer cylinder 13's inner wall, and this helical ribbon 20 is used for transporting the solid product separated from the solid heat carrier, into the ash outlet 25.

The raw material of this example is mixed with the prearranged solid heat carrier and this mixture is transported into the outer cylinder for the cracking process. The oil-gas formed in the cracking reaction is emitted through the oil-gas outlet, and the solid product produced thereby is separated from the solid heat carrier in the screen mesh. Then, the solid heat carrier is transported back into the outer cylinder's left end and mixes with the newly imported raw material for the new cracking process. Furthermore, the solid product is transported into the ash outlet and emitted out. Following the above process can realize the continuous work of this invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An industrial continuous cracking device of plastics, comprising:

an outer cylinder having an outer cylinder cavity for receiving a solid state heat carrier and an oil-gas outlet;

an internal cylinder supported in said outer cylinder, wherein two ends of said internal cylinder are coupled with said outer cylinder, wherein said internal cylinder has an internal cylinder cavity communicating with said outer cylinder cavity;

a heating mechanism supported in said internal cylinder for heating said solid state heat carrier when said solid state heat carrier enters into said internal cylinder;

an outer cylinder helical ribbon provided along said inner wall of said outer cylinder to define an outer cylinder feeding direction for feeding a mixture of raw material and said solid state heat carrier at said outer cylinder feeding direction when said raw material is fed into said outer cylinder;

a transport mechanism provided in said internal cylinder to define an internal cylinder feeding direction which is opposite to said outer cylinder feeding direction;

an import mechanism which is located between said outer cylinder and said internal cylinder and is provided at an inlet side of said internal cylinder, wherein said import mechanism is arranged for importing said solid state heat carrier from said outer cylinder into said internal cylinder when said solid state heat carrier is separated after cracking process; and a separating mechanism provided in said outer cylinder for separating said solid state heat carrier and a solid cracking product after cracking process, wherein said separating mechanism comprises a screen mesh having a tubular shape provided at said inlet side of said internal cylinder and a baffle provided at an outer side of said screen mesh, wherein said outer cylinder helical ribbon is located between said inner wall of said outer cylinder and said screen mesh.

2. The industrial continuous cracking device, as recited in claim 1, wherein said internal cylinder is a rolling cylinder, wherein said transport mechanism comprises an inner cylinder helical ribbon provided at an inner wall of said internal cylinder.

3. The industrial continuous cracking device, as recited in claim 2, wherein said import mechanism is provided at an import end of said internal cylinder to form a funnel for importing said solid state heat carrier from said outer cylinder into said internal cylinder.

4. The industrial continuous cracking device, as recited in claim 1, wherein said heating mechanism is supported at a center of said internal cylinder along an axis direction of said internal cylinder.

5. The industrial continuous cracking device, as recited in claim 3, wherein said heating mechanism is supported at a center of said internal cylinder along an axis direction of said internal cylinder.

6. The industrial continuous cracking device, as recited in claim 4, wherein said heating mechanism comprises a tube supported within said internal cylinder for heating said solid state heat carrier, wherein two ends of said tube are extended through said outer cylinder and are connected to a drive mechanism.

7. The industrial continuous cracking device, as recited in claim 5, wherein said heating mechanism comprises a tube supported within said internal cylinder for heating said solid state heat carrier, wherein two ends of said tube are extended through said outer cylinder and are connected to a drive mechanism.

8. The industrial continuous cracking device, as recited in claim 1, wherein said outer cylinder further comprises a raw material inlet located adjacent to said oil-gas outlet.

9. The industrial continuous cracking device, as recited in claim 7, wherein said outer cylinder further comprises a raw material inlet located adjacent to said oil-gas outlet.

10. The industrial continuous cracking device, as recited in claim 5, wherein said outer cylinder further comprises a raw material inlet located adjacent to said oil-gas outlet.

11. The industrial continuous cracking device, as recited in claim 1, further comprising an outer crust sealingly receiving a main part of said outer cylinder therein and two shell covers sealingly connected at two ends of said outer cylinder to form a cracking chamber between said shell cover and said outer cylinder, wherein said outer cylinder is rotatable, wherein said heating mechanism comprises a thermal pipe connected to said internal cylinder through an inner cylinder helical ribbon in said internal cylinder, wherein two ends of said thermal pipes are extended out of said internal cylinder and are sealingly coupled at said outer shells respectively.

12. The industrial continuous cracking device, as recited in claim 2, further comprising an outer crust sealingly receiving a main part of said outer cylinder therein and two shell covers sealingly connected at two ends of said outer cylinder to form a cracking chamber between said shell cover and said outer cylinder, wherein said outer cylinder is rotatable, wherein said heating mechanism comprises a thermal pipe connected to said internal through said inner cylinder helical ribbon in said internal cylinder, wherein two ends of said thermal pipes are extended out of said internal cylinder and are sealingly coupled at said outer shells respectively.

13. The industrial continuous cracking device, as recited in claim 11, wherein said outer cylinder further comprises a raw material inlet located corresponding to a front part of said internal cylinder.

14. The industrial continuous cracking device, as recited in claim 11, wherein said outer cylinder further comprises a raw material inlet located corresponding to a front part of said internal cylinder.

15. The industrial continuous cracking device, as recited in claim 11, further comprising two joints provided at two ends of said outer cylinder, wherein said outer cylinder further comprises a raw material inlet, wherein one of said joints located adjacent to said raw material inlet comprises an additional helical ribbon provided at an outer side of said internal cylinder and extended to said inner cylinder helical ribbon.

16. The industrial continuous cracking device, as recited in claim 12, further comprising two joints provided at two ends of said outer cylinder, wherein said outer cylinder further comprises a raw material inlet, wherein one of said joints located adjacent to said raw material inlet comprises an additional helical ribbon provided at an outer side of said internal cylinder and extended to said inner cylinder helical ribbon.

* * * * *